Dec. 17, 1957 J. P. KOVACS ET AL 2,816,663
DISC TYPE FILTER

Filed Aug. 9, 1954 3 Sheets-Sheet 1

INVENTORS
Julius P. Kovacs
Alfred A. Leebardt
BY
Kenyon & Kenyon
ATTORNEYS

Dec. 17, 1957 J. P. KOVACS ET AL 2,816,663
DISC TYPE FILTER
Filed Aug. 9, 1954 3 Sheets-Sheet 2

INVENTORS
Julius P. Kovacs
Alfred A. Leebardt
BY Kenyon & Kenyon
ATTORNEYS

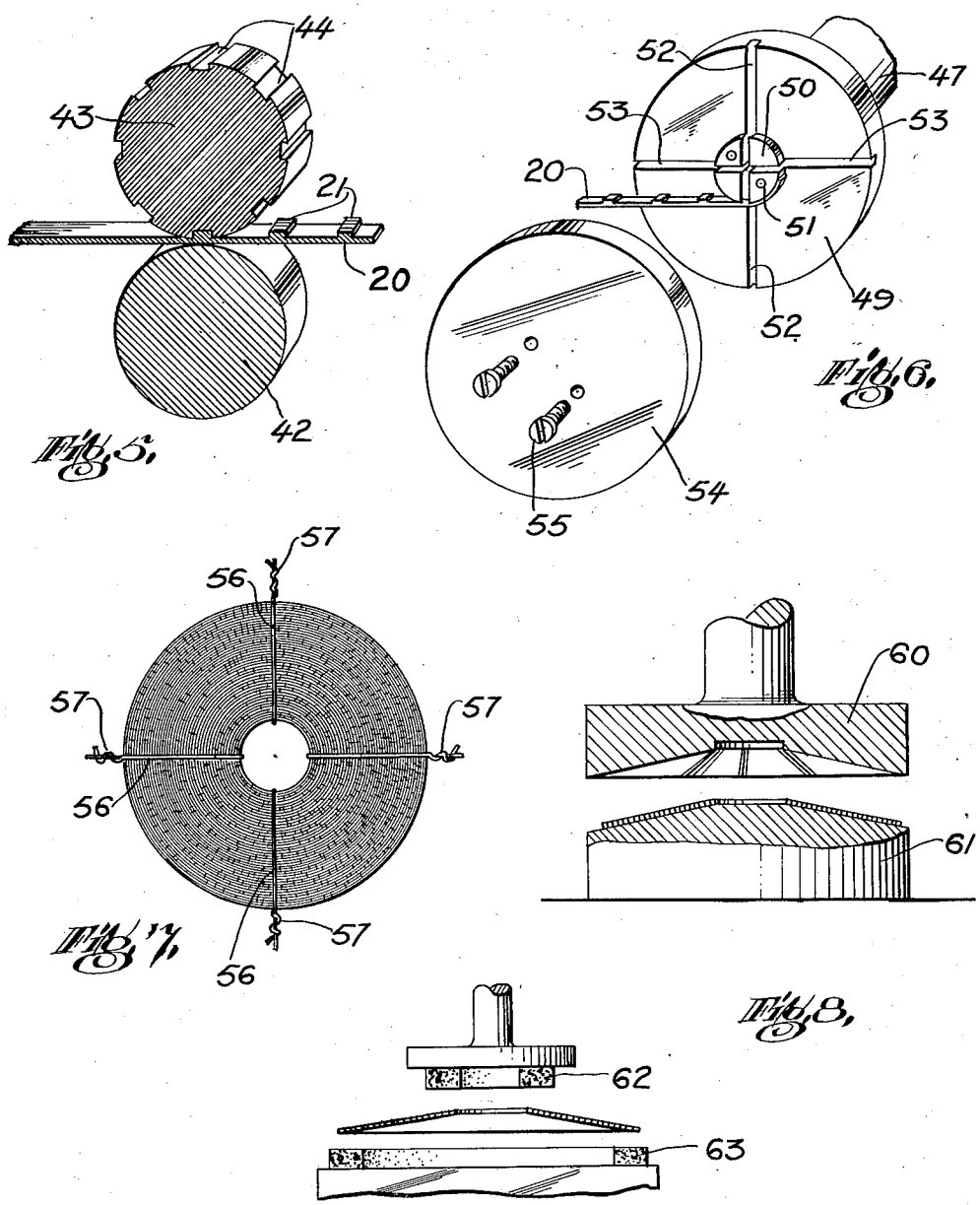

2,816,663
DISC TYPE FILTER

Julius P. Kovacs, Westfield, and Alfred A. Leebardt, Nixon Park, N. J., assignors to Purolator Products, Inc., Rahway, N. J., a corporation of Delaware Application August 9, 1954, Serial No. 448,552

4 Claims. (Cl. 210—347)

This invention relates to filters of the edge type, that is, to filters comprising ribbed flat ribbon wound in helical form wherein filtration is effected by passage of the fluid through interstices between adjacent turns which are defined by the ribs on the ribbon. More particularly, the invention relates to filter construction embodying a plurality of helically wound ribbed ribbon filtering discs arranged in superposed relationship in such a way as to provide a relatively large effective filtering area.

A filter embodying the features of the present invention comprises generally a filter housing in which an axially disposed perforated center tube is provided. A series of superposed filtering discs having cut-out centers are stacked on the center tube. These filtering discs individually consist of a flat ribbed ribbon wound helically in radially expanding turns with the ribs spacing the individual turns and defining filtering interstices. The turns are bonded so that the discs have permanent form and have filtering interstices between turns defined by the ribs. The individual discs after having been wound and brazed or otherwise set are provided with dome-like, bowed or substantially frusto conical configuration or cross section. These discs when stacked upon the center tube are arranged with their wider bases in alternatively opposite positions so that adjacent pairs of the discs define outlet spaces or zones, each of the latter of which communicates with perforations in the center tube. The engaging edges at the inner and outer rims of the individual discs are provided with ground surfaces for close fitting abutment with one another. The stacked pairs of discs are maintained on the center tube in abutting relationship, for example, by appropriate spring means. With such arrangement fluid to be filtered that enters the filter housing passes from the latter edgewise through the filtering interstices in the various discs, into the zones defined between adjacent pairs of said discs and thereafter from the said zones through the perforations in the center tube and thence outwardly from the center tube.

Principal objects and features of the invention are the provision of a filter of improved design wherein greater effective filtering area is available for a filter housing of given dimensions.

Other objects and features of the invention are the provision of a filter embodying a series of superposed filtering discs with a minimum of additional structure.

Additional objects and features of the invention are the provision of a filter that is simple to assemble and disassemble and to clean.

Further objects and features of the invention will become apparent from the following specification and the accompanying drawings, wherein:

Fig. 5 is a perspective view of the ribbed-forming portion of the machine;

Fig. 6 is an exploded perspective view of winding mechanism in the machine for preparing the filtering elements from the ribbed ribbon;

Fig. 7 is a plan view of a wound filter element in its bound condition preparatory to the permanent bonding together of its spiral turns;

Fig. 8 is a partially sectionalized elevational view of apparatus utilized for converting the helically wound bonded elements into filtering components having dome-like, bowed or frusto conical sections; and Fig. 9 is a similar view of grinding apparatus utilized for finishing the edges of the filter elements for close abutment with one another.

Figure 1:
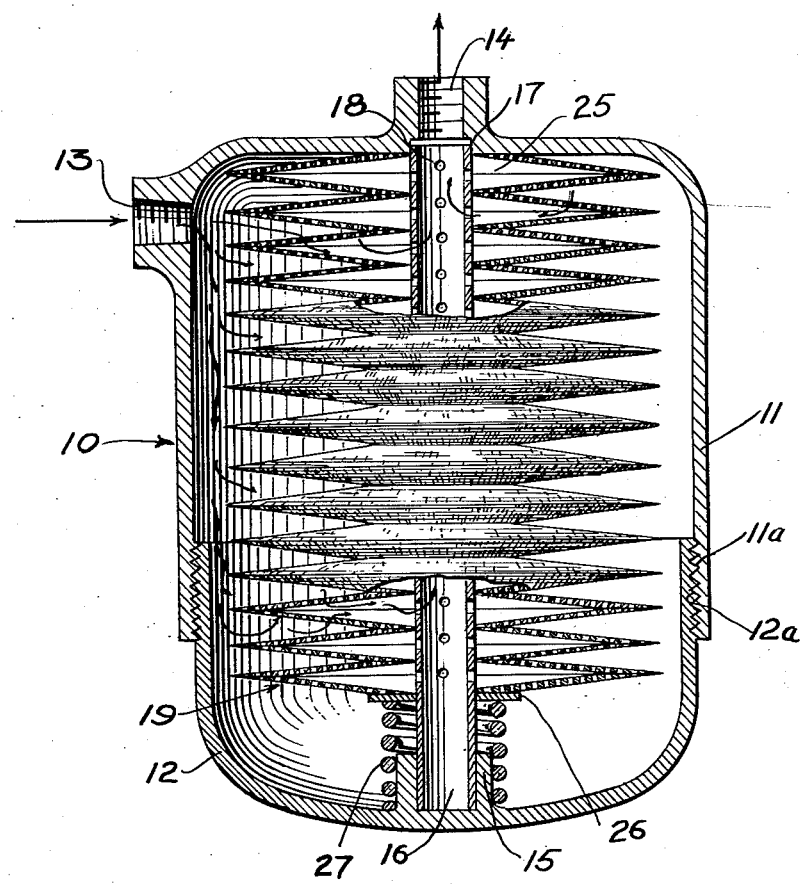
Fig. 1 is a vertical section through a filter embodying the invention.
Figure 2:
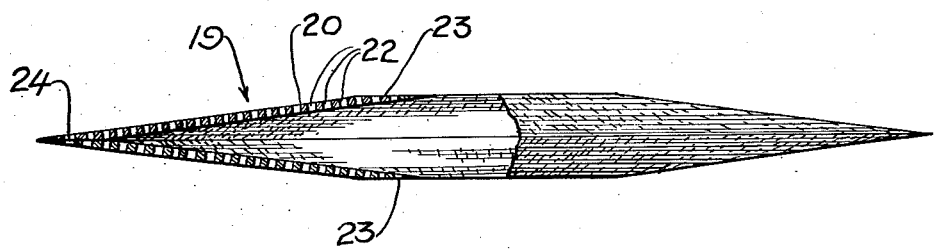
Fig. 2 is a partially sectionalized elevation of a pair of assembled filter elements or components of the invention.
Figure 3:
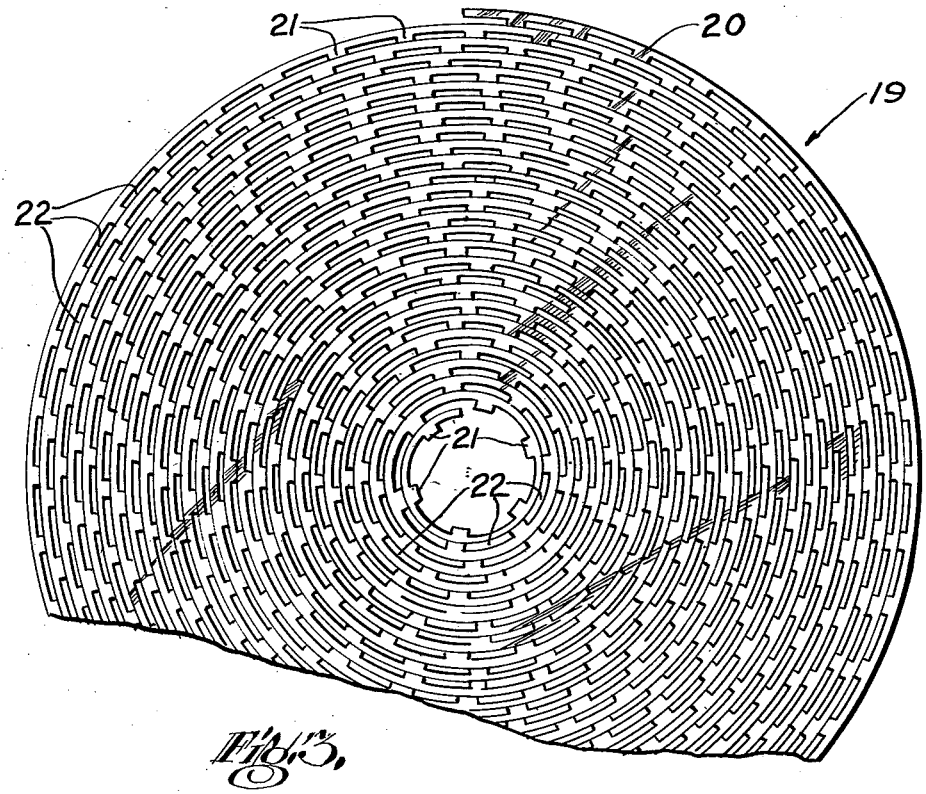
Fig. 3 is a plan view of one of such filter elements or components.

Referring to the drawing and first to Figs. 1-3, inclusive, the reference character 10 denotes generally a filter embodying the invention. This filter 10 includes a housing made of two separable housing parts 11 and 12 which may be joined as by inter-engagement of their mating threaded ends 11a and 12a. The upper housing part 11 has an inlet opening 13 at one side and a centrally located outlet opening 14. The lower housing part 12 has a centrally located tubular boss 15. This boss 15 serves as the support for the lower end of a center tube 16. The upper end of the center tube 16 fits within a recess 17 provided in the upper housing part 11 adjacent the outlet 14. The center tube 16 thus extends axially of the housing parts 11 and 12. A plurality of perforations 18 are provided in the wall of the center tube 16 for purposes presently to be described.

A plurality of filtering elements or components 19 are supported in superposed relationship on the center tube 16. Each of the filtering element components 19 consists of a substantially dome-like, bowed or frusto conically shaped disc made of a single helical winding of ribbed ribbon 20. The ribbon 20 has substantially rectangular section and is provided with regularly spaced ribs 21 upstanding from one of its flatter wide faces. The ribbon 20 is wound in helical or spiral radially expanding turns as will be presently described with the ribs 21 of each succeeding turn engaging the adjacent smooth face of the previous turn. This results in defining accurately dimensioned interstices 22 between adjacent turns.

The convolutions or turns are permanently bonded together to form the disc-like shaped element 19 as by brazing or fusing the engaging surfaces of the adjacent turns together. When the fusion or brazing has been completed the individual discs 19 are interposed between appropriate dies to give them dome-like, bowed or frusto conical shape or section as seen in Fig. 2. Thereafter the individual elements are ground adjacent their inner and outer peripheral edges to provide the respective inner and outer seating surfaces 23 and 24.

The individual bowed filtering discs or elements 19 are mounted in superposed or stacked relationship on the center tube 16 with alternate of the elements having their larger diametered bases facing in opposite directions. In consequence, adjacent pairs of the elements 19 define definite spaces or zones 25. The respective engaging surfaces 24 of adjacent pairs of the elements 19 provide outer lateral seals therefor. In addition, abutting ground surfaces 23 define inner seals between adjacent groups of pairs of the elements 19. The zones or spaces 25 lie in registry with the perforations 18 of the center tube 16. The lowermost element 19 on the center tube 16 rests upon a washer 26 which is pressed axially along the center tube 16 as by a spring 27 to maintain surface engagement between the respective abutting seats or surfaces 23 and 24 of the various individual elements 19.

With the arrangement as described, liquid that is to be filtered which enters the housing through its inlet 13 fills the latter and is compelled to flow through the various filtering interstices 22 of the stacked individual filter elements 19 into the zones 25 in order to pass via perforations 18 in the center tube 16 into the latter and thence outwardly via the outlet 14. In the passage of the fluid through the interstices 22 solid contaminants which are of larger dimensions than said interstices are trapped and retained on the outermost surfaces of the individual elements 19. The liquid reaching the outlet 14 thus is filtered.

It is a simple matter to unscrew the housing part 12 from part 11 and remove the individual filter elements 19 stacked on the center tube 16 either for cleansing or for replacement. After one or the other of these procedures has been effected the filter is reassembled into the condition shown in Fig. 1 for further use.

Figure 4:
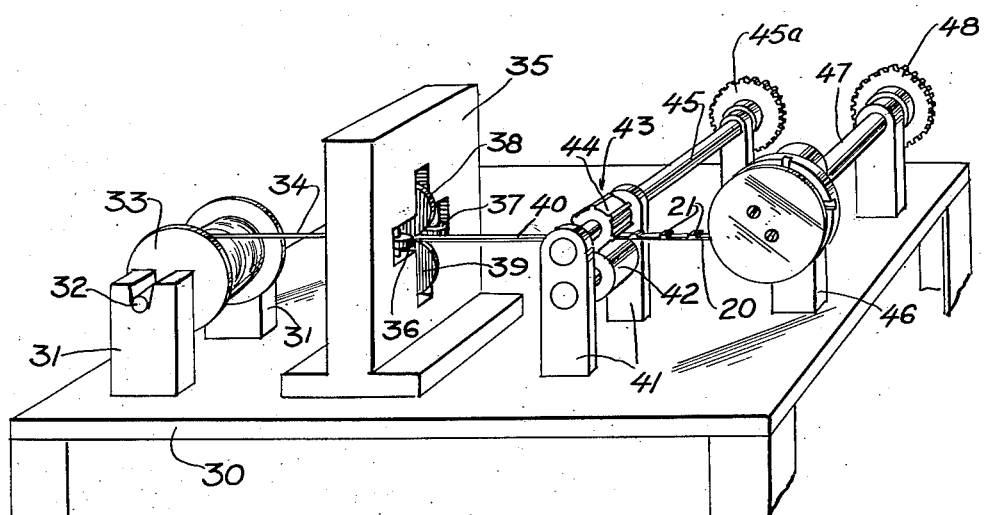
Fig. 4 is a schematic showing of a machine for manufacturing the individual filter elements or components.

The individual filter elements 19 embodying the invention are manufactured in a simple manner, for example, as follows:

An assembly bench 30 (Fig. 4) is provided with a pair of slotted supports 31 which receive the spindle 32 that carries a spool 33 of round wire 34.

A conventional wire-drawing die 35 is carried on the bench 30 in a position such that the wire 34 may be led thereto. This die comprises generally a pair of horizontally disposed rollers 36 and 37 and a pair of vertically disposed rollers 38 and 39 mounted in usual relationship to each other for conversion of the round wire 34 to wire 40 having substantially rectangular cross-section. The drawing of the wire 34 through the die 35 converts it into wire 40 which has substantially rectangular cross-section and in which the upper and lower parallel faces are the wider ones.

The bench 30, also, carries a pair of supports 41 which serve as mounts for horizontally disposed pair of die rollers 42 and 43. The roller 42 of this pair has a smooth periphery, whereas the roller 43 is provided in its peripheral surface with a plurality of regularly shaped transversely extending grooves or recesses 44. The supporting shaft 45 of the roller 43 is driven, for example, from a gear 45a connected to appropriate driving mechanism (not shown). When the rectangular wire 40 is drawn between the pair of rollers 42 and 43, the upper surface of the wire 40 has regularly spaced transversely extending ribs 21 formed on its upper surface while its lower surface remains smooth, thus being converted into the ribbon 20 from which the individual filter elements 19 are formed. In practice, the round wire 34 may have an original diameter of approximately .025 inch. Drawing of this wire through the die 35 converts it into the rectangularly cross-sectioned wire 40 whose upper and lower edges are approximately .032 inch wide and whose side edges are approximately .010 inch high. The further drawing of the wire 40 between the rollers 42 and 43 converts it to ribbed wire 20 provided with ribs 21 of any desired height depending upon the depth of the respective grooves 44. These grooves usually are of the order of approximately .002 inch deep and approximately .06 inch wide.

A wind-up device is arranged to receive the ribbed ribbon 20 emerging from between the pair of die rollers 42 and 43. This wind-up device includes the shaft supports 46 carrying a horizontally disposed driven shaft 47 driven, for example, through a gear 48 from the driving mechanism (not shown). The shaft 47 carries an end plate or disc 49 (Fig. 6). The disc 49 has a centrally located axially off-set core 50 provided with the threaded holes 51. Perpendicularly disposed diametrically extending crossing slots 52 and 53 are provided in the surfaces of the disc 49 and its core 50. A cover plate 54 of substantially the same diameter of the disc 49 is removably mountable on the core 50 in parallel relationship with the disc 49 as by the bolts 55 which are engageable in the threaded holes 51. The wind-up mechanism just described operates as follows:

The ribbed wire 20 leaving the die rollers 42 and 43 is temporarily secured to the core 50 and the cover plate 54 assembled with core 50 and disc 49 by bolts 55. Shaft 47 is then rotated to wind the ribbed wire 20 onto the core 50 in a plurality of spiral or helical radially expanding turns of a determined number. When winding has been completed the cover 54 is removed and four binding wires or stays 56 are passed around the wound element on the core 50, the slots 52 and 53 serving to facilitate wrapping of these binding wires 56 around said element. Each of the wrapping wires 56 has its outer ends twisted at 57 to provide a temporary binding of the wound element turns. The wound element with its temporary wire stays 56 is then separated from the ribbed wire 20 as by cutting and the wound element removed from the core 50.

The wrapped temporarily bound wound element is then treated to permanently bond the contacting surfaces of its adjacent turns together. This permanent bonding may be effected, for example, by lowering or dipping the wire-bound element itno a brazing bath. In the alternative, if the ribbed wire 20 has had a fusible coating previously applied to its surfaces, permanent bonding may be effected simply by subjecting the wire-bound wound element to a temperature sufficient to fuse the coating. Upon cooling of the fused coating the adjacent turns remain bonded together.

The element with bonded turns after removal from the brazing bath or the fusing zone has its wire stays 56 removed. The disc-like element resulting is then positioned between a pair of forming dies 60 and 61 which serve to mold or shape the disc into dome-like, bowed or frusto conical shape or section when the forming dies 60 and 61 are pressed together with the element between them. After forming the bowed, dome-like or frusto conical shape or section in the individual elements, the inner and outer portions adjacent the inner and outer peripheries of said elements are ground substantially flat by appropriate grinding wheels 62 and 63. This grinding provides the respective flat surfaces 23 and 24 of the element 19. The individual elements 19 formed in the manner just described are then ready for assembly in the filter element 10 of Fig. 1.

It can be seen, therefore, that the apparatus provides an effective way of forming individual filter elements having dome-like, bowed or frusto conical shape or section which consist individually of ribbed wire formed from initially round wire, with the ribbed wire wound into spiral or helical, radially expanding turns in which ribs protruding from one wider surface of each turn are in bonded contact with the wider face of the adjacent turn, and filtering interstices are defined by the ribs.

The individual filter elements are then stacked on a center tube in a filter housing in abutment and with adjacent elements facing in opposite directions so that outlet spaces or zones are defined between adjacent elements of a pair. The liquid filtered is compelled to flow through the interstices in individual elements into said zones for passage to the center tube and outward of the housing outlet.

While specific embodiments of the invention have been shown and described, variations within the scope of the appended claims are possible and are contemplated. There is no intention, therefore, of limitation to the exact details shown and described.

What is claimed is:

1. A filter comprising a housing having inlet and outlet openings, a perforated tube mounted within the housing and connected to the outlet opening, and individually removable filter elements stacked on said center tube so that liquid to be filtered is compelled to flow through the elements for filtration thereby and into said tube in its traverse to the outlet, each of said elements consisting of a disc having bowed section and made of ribbed flat ribbon arranged in spiral radially expanding turns with ribs of the ribbon spacing its turns and defining filtering interstices, said turns being permanently bonded together at the areas of contact of ribs and ribbon surfaces of adjacent turns said elements being stacked on said tube with the bow direction of alternate discs faced opposite to that of those adjacent thereto.

2. A filter comprising a housing having an inlet and an outlet, a perforated center tube within said housing and in communication with said outlet, a plurality of individually removable edge type filter element discs stacked on said tube and each made of spirally wound ribbed ribbon in radially expanding turns with the ribs of the ribbon spacing adjacent turns to define filtering interstices, said turns being permanently bonded together at the areas of contact between ribs and ribbon surfaces of adjacent turns, and having substantially frusto conical shape, inner and outer edge regions of said elements each having seating surfaces for mating abutment with corresponding surfaces of adjacent discs, said discs being positioned on said center tube with the tapers of adjacent discs arranged oppositely so that the corresponding seating surfaces of adjacent discs abut each other, and means for maintaining such abutment between the discs.

3. A filter element comprising a ring-like disc of flat ribbed ribbon arranged in spiral radially expanding turns with ribs of the ribbon spacing the adjacent turns to define filtering interstices, said turns being permanently joined together, said disc having a bowed configuration and flat seating surfaces adjacent its peripheral inner and outer edges, said surfaces being disposed in parallel planes.

4. A filter element of the individually replaceable type comprising a disc consisting of flat-ribbed ribbon disposed in spiral radially expanding turns with the ribs of the ribbon spacing adjacent turns to define filtering interstices, said turns being permanently bonded together at the areas of contact between ribs and ribbon surfaces of adjacent turns, said disc having a bowed configuration and an opening internally of its outer periphery and said disc having seating surfaces adjacent its outer periphery and the perimeter of said opening which are adapted to mate with corresponding seating surfaces of like elements when the latter are stacked on a support extending through each said opening.

References Cited in the file of this patent

UNITED STATES PATENTS

| | | |
|---|---|---|
| 1,688,326 | Boulade | Oct. 23, 1928 |
| 1,902,435 | Elder | Mar. 21, 1933 |
| 2,083,148 | Coulombe | June 8, 1937 |
| 2,088,199 | Gleason | July 27, 1937 |
| 2,129,697 | Louisot | Sept. 13, 1938 |
| 2,312,415 | Jens | Mar. 2, 1943 |
| 2,327,686 | Williams et al. | Aug. 24, 1943 |
| 2,538,575 | Kracklauer | Jan. 16, 1951 |

FOREIGN PATENTS

| | | |
|---|---|---|
| 9,228 | Great Britain | Apr. 13, 1911 |
| 635,557 | Great Britain | Apr. 12, 1950 |